Oct. 12, 1965    R. J. CREAGAN    3,211,621
HETEROGENEOUS BREEDER OR CONVERTER TYPE NEUTRONIC REACTOR
Original Filed Sept. 27, 1957    10 Sheets-Sheet 6

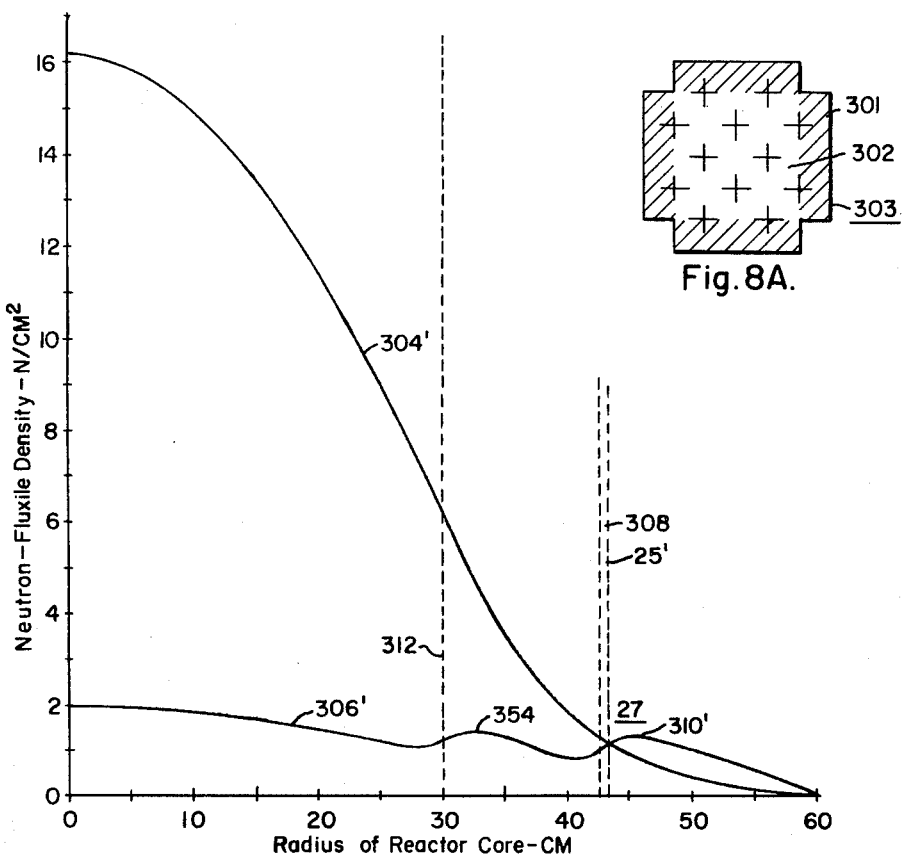
Fig. 8A.
Fig. 8.
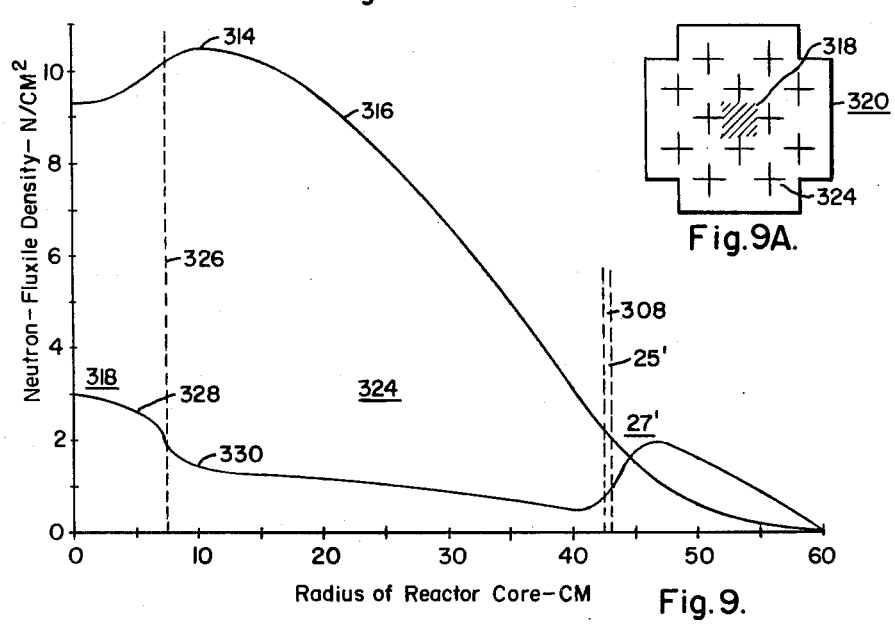
Fig. 9A.
Fig. 9.

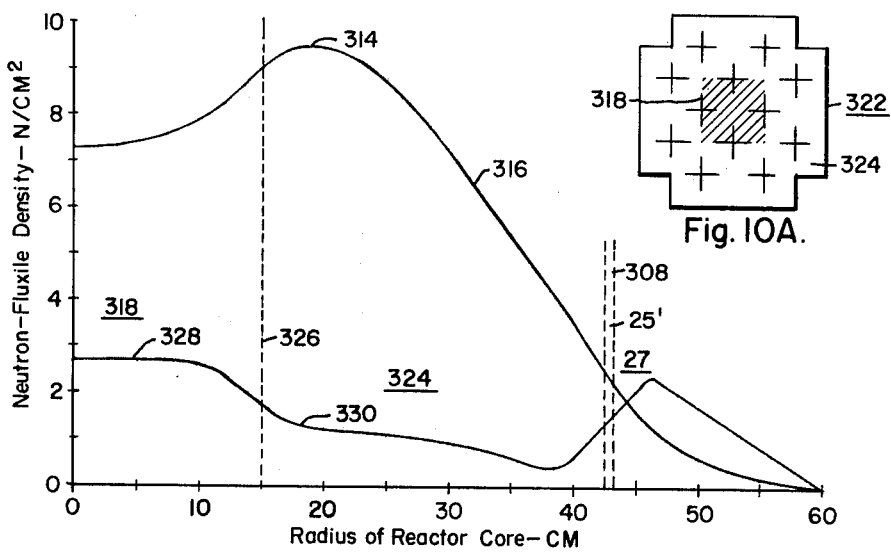
Fig. 10.
Fig. 10A.
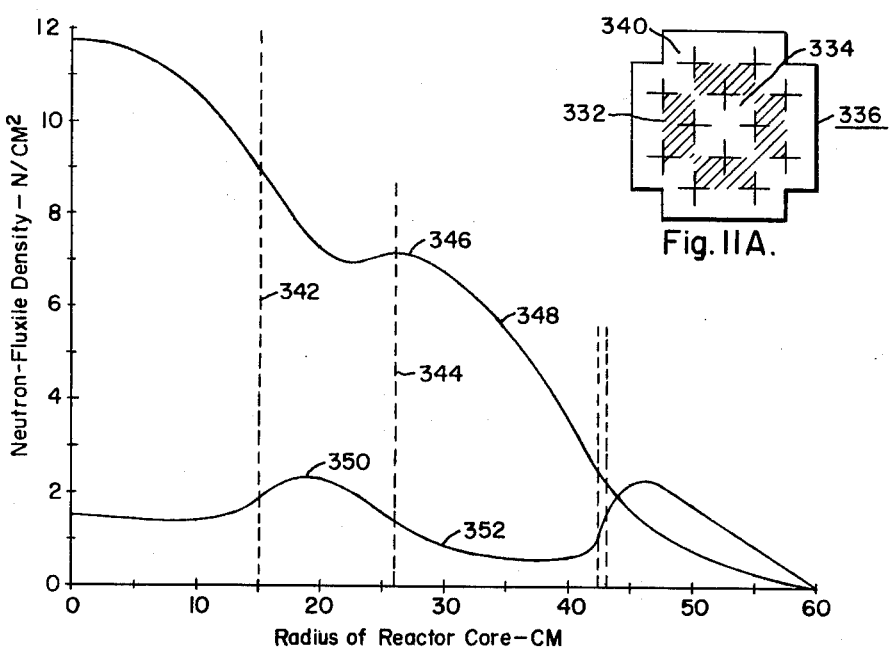
Fig. 11.
Fig. 11A.

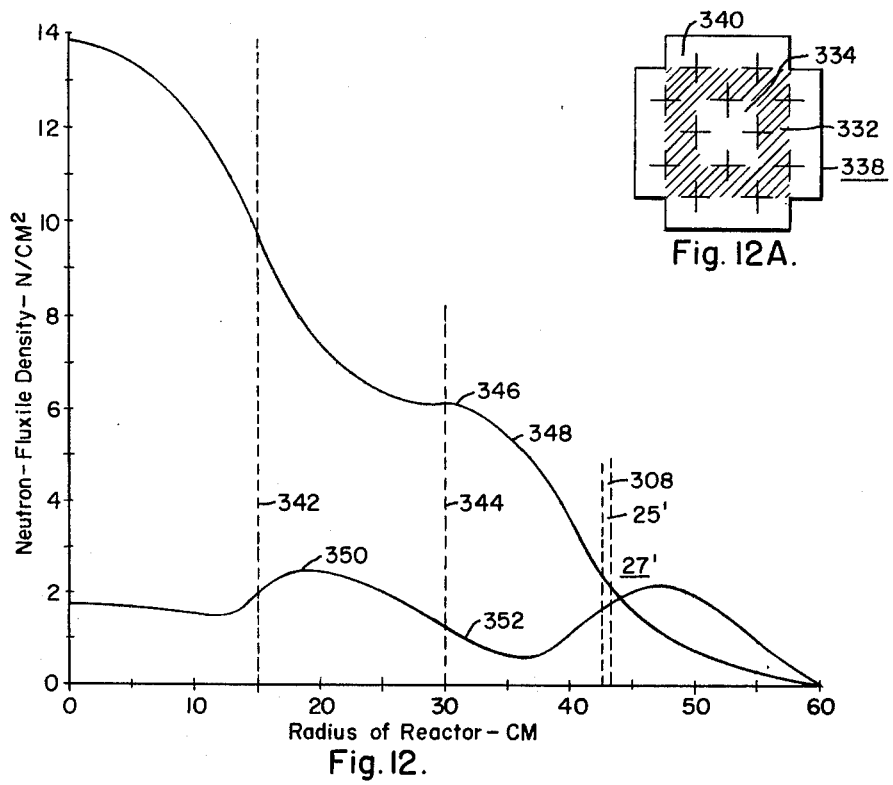
Fig. 12A.
Fig. 12.
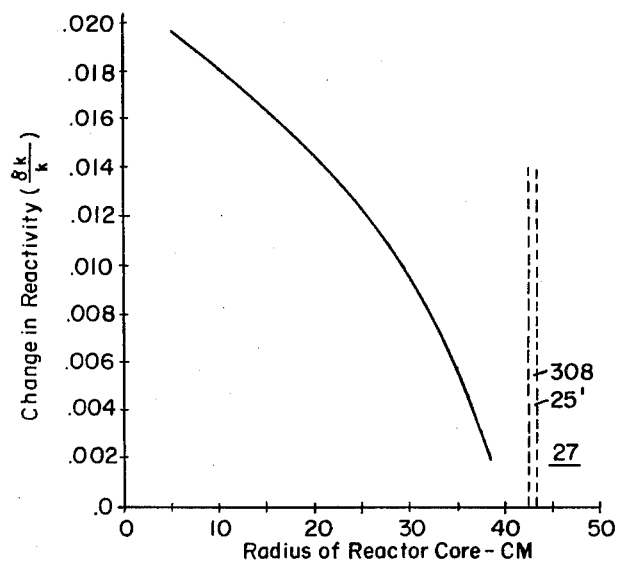
Fig. 13.

United States Patent Office 3,211,621
Patented Oct. 12, 1965

3,211,621
HETEROGENEOUS BREEDER OR CONVERTER
TYPE NEUTRONIC REACTOR
Robert J. Creagan, Birmingham, Mich., assignor to Westinghouse Electric Corporation, East Pittsburgh, Pa., a corporation of Pennsylvania
Continuation of application Ser. No. 686,778, Sept. 27, 1957. This application Sept. 29, 1960, Ser. No. 59,268
5 Claims. (Cl. 176—18)

This application is a continuation of applicant's copending application entitled Neutronic Reactor, filed September 27, 1957, Serial Number 686,778, now abandoned.

The present invention relates to a core loading arrangement for a heterogeneous neutronic reactor and more particularly to such an arrangement adapted for use with a heterogeneous converter type reactor.

In a nuclear reactor, generally speaking, a critical quantity of a neutron-fissionable isotope, such as $U^{233}$, $U^{235}$, or $Pu^{239}$, or mixtures thereof is subjected to fission by absorption of neutrons, with the result that a self-sustaining chain reaction within the isotope is established by an excess of neutrons evolved by the fission. In the heterogeneous type, the reactor comprises a number of fuel elements of fissionable material, for example natural or enriched uranium encased within a suitable protective covering. The fuel elements may be disposed in a neutron slowing material which slows the fast neutrons evolved in each atomic fission to thermal energy levels thereof, at which the neutrons are most efficient to induce fission within the uranium or other atomic fuel. The slowing material is termed a neutron moderator and preferably is formed of a substance having the characteristics of relatively small neutronic capture cross section and relatively large scattering cross section. The heat evolved by the chain reaction is removed generally by passage of a suitable coolant through the reactor core in heat exchanging relationship with the fuel elements disposed therein. Specific details of the operational theory of such reactors are set forth in Enrico Fermi and Leo Szilard Patent No. 2,708,656, dated May 17, 1955.

In a breeder or regenerative-type reactor, denoted here generally as a converter reactor, the chain-reaction sustaining core thereof frequently is divided into two regions, with one known as the "blanket" or fertile portion and containing a number of fuel elements, each having a quantity of natural uranium or thorium, and with the other known as the "seed" or enriched portion and containing a plurality of fuel elements having a quantity of enriched nuclear fuel. This enriched fuel may include an amount of $U^{238}$ with a greater than normal or natural proportion of $U^{235}$, or of an amount of uranium or thorium enriched with one of the known fissile isotopes $U^{233}$, $U^{235}$, or $Pu^{239}$. These fissionable and fertile isotopes are denoted generally herein as "fissile" materials.

During the lifetime of the reactor core, the absorption of neutrons by the $U^{238}$ atoms contained in the blanket portion converts these atoms into neptunium 239 which in turn decays with further emission of beta radiation to plutonium 239. The aforedescribed elemental transmutation is depicted by the following nuclear equations:

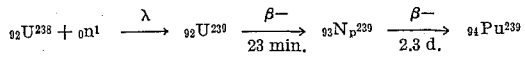

with the times associated with latter two reactions being the half-lives of the decaying elements. The trans-uranic element $_{94}Pu^{239}$ possesses characteristics similar to those of uranium 235 with regard to nuclear fissioning, in the well-known manner, by means of thermoneutrons. Moreover, the isotope $_{94}Pu^{239}$, although an alpha emitter, is relatively stable in that it has a half-life of 24,000 years.

In those neutronic reactors employing a blanket portion of thorium surrounding a seed portion of enriched nuclear fuel, a somewhat similar nuclear reaction is induced within the thorium atoms upon absorption of neutrons produced by the chain reaction. In this case, however, an isotope, thorium 233, is formed which is converted by radioactive beta decay into a fissionable, artificial isotope, uranium 233, which, like $U^{235}$ and $Pu^{235}$ and $Pu^{239}$ fissions upon impingement of thermoneutrons. The progress and rate of the aforesaid nuclear reaction is depicted by the following relationships.

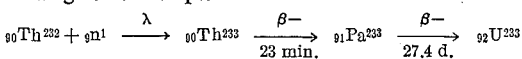

wherein the times denoted beneath some of the reactional arrows again represent the half-lives of the relatively unstable isotopes $_{90}Th^{233}$ and $_{91}Pa^{233}$, respectively.

Thus, during the lifetime of the core, in appropriate types of reactors, the aforesaid nuclear reaction results in the production of supplemental fissionable material, in the form of $U^{233}$ or $Pu^{239}$ as the case may be, which material may be at least equivalent to or greater than that consumed in the chain-reaction. However, the neutron-absorbing nuclear fragments or fissional products of the chain-reaction and the relative positional redistribution of the fuel in known reactor core loading arrangements, brought about as the original fissionable isotope is consumed in the enriched portion and additional fissionable isotope is "bred" in the blanket portion of the core, tend to decrease comparatively rapidly the available reactivity of the core and thus to foreshorten its lifetime.

In many types of converter reactor systems, the nuclear fuel produced or bred therein is less than that consumed by the chain-reaction. As a result, the reactivity of the core decreases still more rapidly during its lifetime. In order to prolong the lifetime of the reactor core, it has been the practice to supply initially an excess amount of $U^{235}$ in the seed or enriched portion of the core. This initial excess reactivity is compensated either by insertion of the control rods usually employed with a heterogeneous neutronic reactor or by the addition of a burnable poison such as boron, which poison is intended to be depleted upon bombardment by neutrons during the lifetime of the reactor core at a rate such that a relatively flat reactivity response is secured from the core during its lifetime.

In prior converter type reactors, it has been thought necessary to place the seed portion thereof at those positions which, in a uniform core, would be subjected to relatively higher neutronic fluxile density. That is to say, that portion of the nuclear fuel having a higher than normal percentage of fissionable isotope was clustered near the center of the reactor, and was surrounded by the fertile or blanket portion of the fuel. With this arrangement, however, the neutronic fluxile density maintained within the blanket portion frequently was not sufficient, particularly at the outer periphery thereof to create any extensive fissioning among the $Pu^{239}$ or $U^{233}$ isotope transmuted from the blanket portion of the core in the manner described previously. Therefore, in order to secure an acceptable lifetime of the core, a relatively large excess of enriched fuel together with a burnable, neutron-absorbent poison had to be added to the seed portion of the core, in many cases.

In view of the foregoing, it is an object of the invention to provide a novel and more efficient neutronic reactor and more specifically to provide an efficient fuel loading arrangement for increasing the lifetime of the core thereof.

A further object of the invention is to provide means for securing a more efficient transmutation in a converter type reactor of its blanket or lowest enriched fuel portion into the corresponding fissionable isotope.

Still another object of the invention is to provide a neutronic reactor core having a relatively flat reactivity response over its lifetime and wherein the requirement of burnable neutron-absorbing poison utilized in the seed or enriched portion thereof is substantially reduced or eliminated altogether.

A still further object of the invention is to provide a novel fuel loading arrangement for a converter-type reactor wherein there is required a lesser percentage enrichment of its enriched or seed portion.

Another object of the invention is the provision of a relatively low enriched reactor core, in which the percentage enrichment is increased toward the outer periphery of the core in order to reduce hot spots within the core and to improve the hot channel factor.

A further object of the invention is the provision of a reactor core in which fertile material or fuel of relatively low enrichment is surrounded by fuel of relatively higher enrichment to increase the conversion ratio of the reactor. An ancillary object is the provision of a reactor core of this character with core areas of varying enrichment but in which all enrichments are relatively low in order to minimize neutron leakage from the core and to increase the available heat transfer surface.

Another object of the invention is to increase the available heat transfer surface and hence power output of a given size of neutronic reactor core by means of a novel fuel loading arrangement of the core.

These and other objects, features and advantages of the invention will be apparent during the forthcoming description of illustrative forms thereof, the description being taken in conjunction with the accompanying drawings, wherein:

FIGS. 8 and 8A are a graphical illustration of neutronic fluxile distribution in a conventional, converter-type reactor core;

FIGS. 9 and 9A are a graphical representation of fluxile distribution in reactor core arranged in accordance with the invention;

FIGS. 10 and 10A are a graphical representation of fluxile distribution in another reactor core of the invention;

FIGS. 11 and 11A are a graphical illustration of fluxile distribution of still another reactor core arrangement pursuant to the invention;

FIGS. 12 and 12A are a graphical representation of fluxile distribution of still another reactor core arrangement of the invention; and FIG. 13 is a graph describing the results of replacing, at various locations within a uniform, enriched core, a single enriched fuel assembly with a fertile assembly of similar configuration.

In accordance with the invention, the fuel elements comprising the blanket or relatively lower enriched portion of the core of the neutronic reactor are disposed adjacent to those areas within the reactor core which normally are at a higher neutronic flux density. More specifically, the aforesaid blanket fuel elements are arranged such that they are substantially surrounded by fuel elements having nuclear fuel material enriched with one of the fissionable isotopes $U^{235}$, $U^{233}$ or $Pu^{239}$. However, the enriched fuel elements are of relatively low enrichment to minimize neutronic leakage from the core, as pointed out hereinafter more fully. In those reactor core arrangements, having a generally cylindrical arrangement the aforesaid areas of highest fluxile density would be those disposed adjacent the geometric center of the core. Pursuant to the invention, then, it is intended that the fuel elements of blanket material or of the lowest enrichment be disposed as near to the center of the core as practical or otherwise disposed such that they are surrounded with fuel elements enriched with one of the aforementioned fissionable isotopes.

Figure 1:
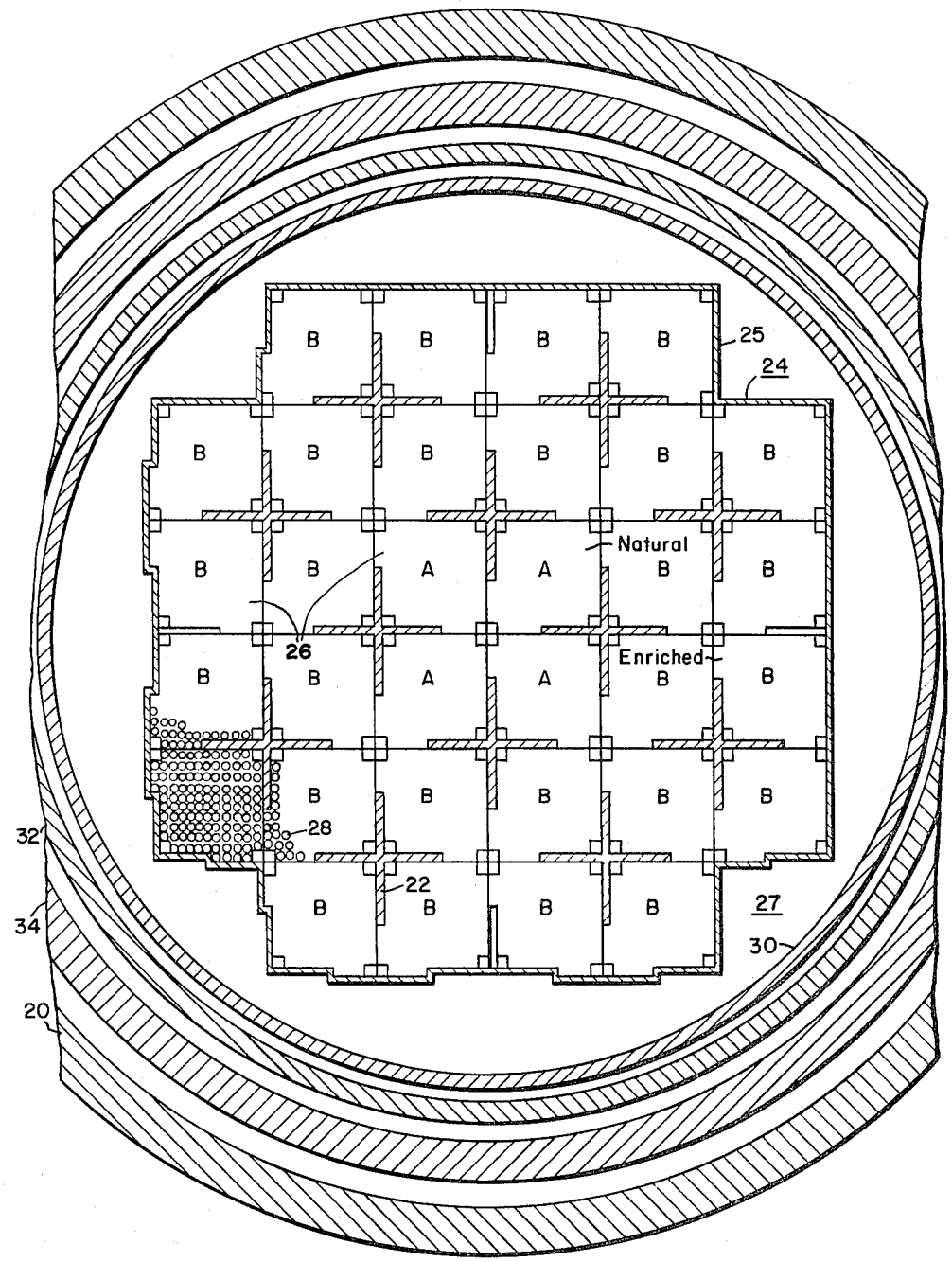
FIGURE 1 is a top plan view of a reactor core of the converter type arranged in accordance with the invention.

Referring now more particularly to FIG. 1 of the drawings, the illustrative form of the invention shown therein is adapted for use with a pressurized liquid type neutronic reactor wherein a coolant fluid such as ordinary water, heavy water or an organic liquid is circulated under pressure through a reactor vessel 20. The reactor vessel 20 is of generally cylindrical formation and in this example is 230 inches high and 5 feet in inside diameter and, in the case of pressurized water coolant maintained under a nominal system pressure of 2,000 pounds per square inch, is formed with approximately a 4¼ inch wall of carbon steel. The vessel 20 can be mounted and shielded for an example, in the manner described in a copending application of Erling Frisch, entitled "Nuclear Reactor," Serial No. 85,877, filed January 30, 1961, filed as a continuation of Frisch's application, Serial No. 610,821, filed September 19, 1957. The former application (Serial No. 85,877) has been assigned to the assignee of the present application, and the latter application (Serial No. 610,821) is now abandoned.

A number of control rod drive mechanisms (not shown) are supported on top of the reactor vessel 20 for operation within sealed housings (not shown) communicating with the vessel 20 in a well-known manner. Each of the rod drive mechanisms is arranged to withdraw or to insert a control rod 22 relative to a reactor core 24 with each of the control rods 22 in this example being cruciform in cross section. In this example of the invention twelve such control rods 22 are employed and are arranged for insertion between adjacent rectilinear assemblies 26 of fuel rods 28. The assemblies are supported within a closely fitting sheath or barrel 25.

In this arrangement, approximately thirty-two fuel rod assemblies 26 are employed and contain in the neighborhood of three hundred fuel rods 28 per asesmbly. Each fuel assembly 26 is substantially similar to the assembly described hereinafter in connection with FIGS. 3 to 6 of the drawings and accordingly, will not be further elaborated upon at this point.

The fuel rod assemblies are supported in the reactor core 24 by a cylindrical cage 30 and by top and bottom core supporting plates (not shown). The reactor core 24 in turn is supported by suitable means (not shown) within the reactor vessel 20. The structural details and manner of supporting the core are similar to that described in detail in connection with FIGS. 3 to 6 of the drawings. Between the cage 30 and the inner wall surface of the reactor vessel 20 are disposed a plurality of generally tubular thermal shields 32 and 34, with two being employed in this example of the invention. The thermal shields are arranged to collect the peripheral neutronic flux which induces the formation of heat within the reactor structural materials when irradiated thereby and thus avoids the generation of heat and resultant thermal stress within the much heavier vessel wall 20. As explained hereinafter more fully, in connection with FIGS. 3 and 4, a quantity of water is maintained in space 27 between the sheath 25 and the cage 30 to serve as a neutronic reflector during operation of the reactor.

In this example of the invention, the aforedescribed blanket portion of the reactor core comprises the fuel assemblies 26 denoted by the letter A, while those fuel elements forming the seed or enriched portion of the core are represented by fuel assemblies marked with the letter B. With this arrangement, it is seen that the respective positions of the seed (B) and the blanket (A) portions of the core are reversed, with reference to their conventional positions. Thus, the blanket portion comprising either natural uranium or thorium is disposed generally at the central portion of the core 24 and is surrounded by seed fuel assemblies 26B containing an enriched nuclear fuel, such as uranium enriched in $U^{235}$ content or with $U^{233}$ or $Pu^{239}$. Accordingly, the blanket fuel assemblies 26A are disposed at an area within the core 24 which has a relatively high neutronic fluxile density. The disposition of the blanket portion in this manner increases the number of neutrons available per unit of blanket material for converting the $U^{238}$ or the thorium, as the case may be, of the blanket fuel assemblies 26A into the fissionable isotope $Pu^{239}$ or $U^{233}$, respectively. Moreover, the arrangement in this fashion of the seed or enriched area of the core 24, which is occupied by the enriched fuel assemblies 26B, permits usage in the seed portion of the core of nuclear fuel having a lower enriched percentage of one of the fissionable isotopes. Thus, a considerable reduction in fuel cost is effected.

With this arrangement of the invention, then, the blanket portion or the fuel elements 26A is arranged at the area of greatest importance insofar as maintaining a chain reaction within the core 24. Consequently, the major proportion of additional nuclear fuel which is transmuted from $U^{238}$ or thorium to the fissionable isotope $Pu^{239}$ or $U^{233}$, respectively, is created within the central portion of the core. This isotope then is disposed in a position which has a greater relative effect upon the chain reaction being sustained within the core. Accordingly, when $U^{235}$ atoms are employed as the enriching isotope in the seed portion (B) of the core and are fissioned during the lifetime of the core, their loss is at least partially counteracted by additional $Pu^{239}$ or $U^{233}$ atoms created within the central portion (A) of the core 24. As a result, the area of greatest reactivity of the reactor core has a tendency to shift its position toward the central portion of the core during the life cycle of the core. Thus, a relatively flat reactivity curve is obtained throughout the lifetime of the core 24, even though the conversion ratio of atoms of fissionable isotope produced within the central or blanket portion of the core relative to the atoms of fissionable isotope consumed in the seed portion of the core is less than unity. This follows from the fact that those fissionable atoms created in the central or blanket portion (A) of the core 24 are of greater importance in the propagation of the chain-reaction being sustained within the reactor core 24 than is the fissionable isotope with which the seed portion (B) of the core originally was enriched.

In the arrangement shown and with the dimensions given heretofore, it is contemplated that a relatively flat reactivity curve will be obtained throughout the core lifetime with little or no addition of burnable poison to the enriched fuel assemblies 26B. In this example then, a total of four fuel assemblies 26A containing about three hundred kilograms of natural or source grade uranium are encompassed by a total of twenty-eight fuel elements 26B containing about 2200 kilograms of uranium, enriched to four percent of $U^{235}$. The neutronic reactor as so arranged is capable of sustained operation with a power output of approximately forty-three megawatts of heat with the power proportioning being such initially that ninety-three percent of the total power is developed in the enriched fuel assemblies 26B and seven percent in the fertile or blanket assemblies 26A.

Figure 2:
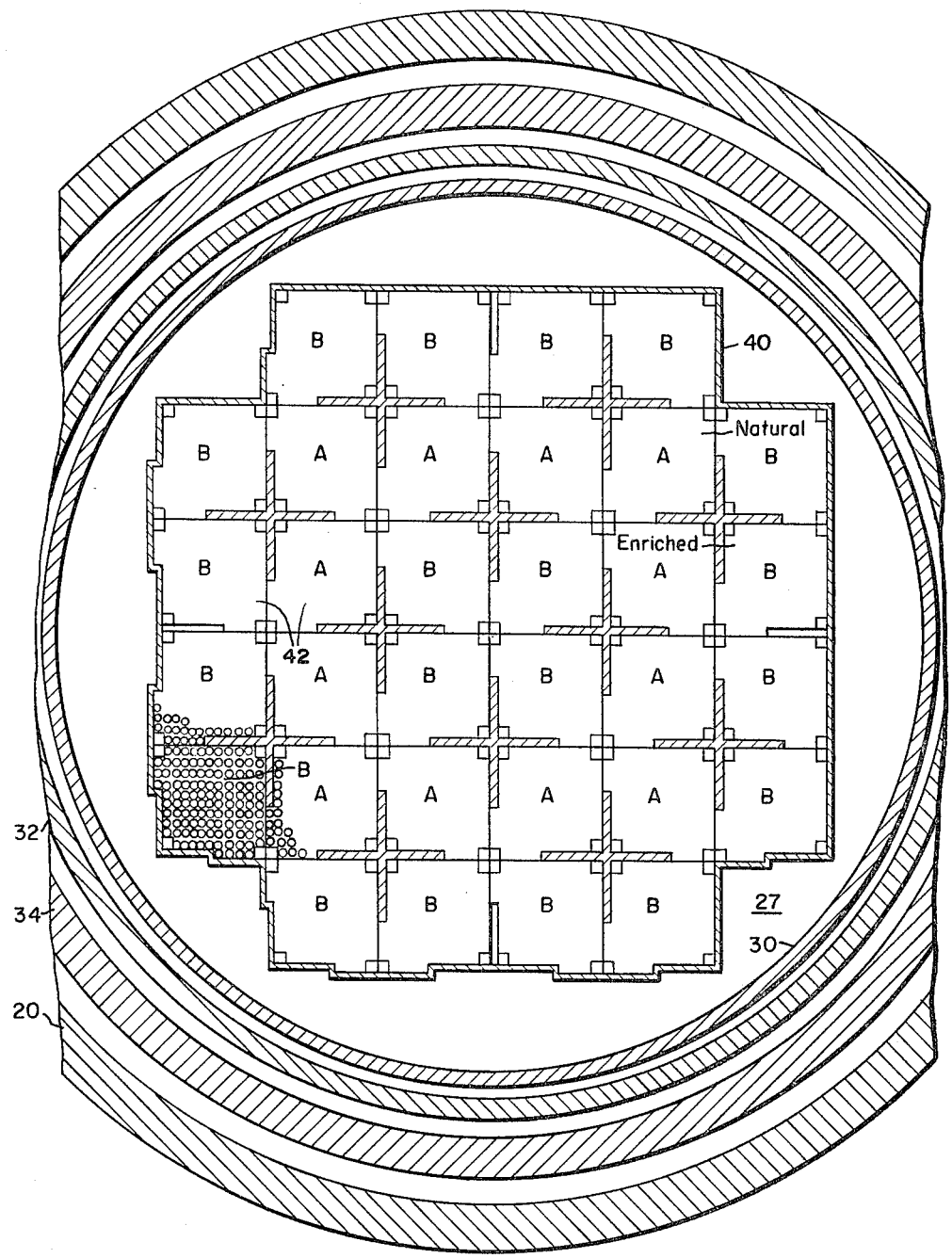
FIG. 2 is a top plan view of another reactor core arranged in accordance with the invention.

Turning now to FIG. 2 of the drawings, a modification of the core arrangement illustrated in FIG. 1 is shown therein. The core arrangement of this form of the invention is arranged for mounting within a neutronic reactor vessel in the manner described heretofore and hence no further reference will be made thereto. In this example of the invention, a reactor core structure 40 is provided with blanket and enriched portions comprising respectively the fuel elements 42A and 42B. In this arrangement, it can be seen that the blanket or lower enriched portion (A) of the reactor core 40 is disposed in the form of an annulus of 12 fuel assemblies surrounding four of the enriched fuel assemblies 42B and is in turn surrounded by the remaining 16 elements of the enriched fuel assemblies 42B disposed adjacent the outer periphery of the core 40. In this specification the term "annulus" is not to be restricted to a configuration having inner and outer circular peripheries but is also to include a member with inner and outer peripheries having a configuration different than circular. In this example, then, three times as many blanket fuel assemblies 42A are utilized as are employed in the core arrangement of FIG. 1. However, the natural fuel assemblies 42A still are surrounded completely by enriched fuel assemblies 42B and thus are disposed in an area of relatively denser neutronic flux within the reactor core 40.

Moreover, the blanket portion 42A, having been arranged as close to the center of the core as practical with due consideration to the number of blanket assemblies employed in this example, still is maintained within an area of relatively greater importance for propagating the chain-reaction being sustained within the reactor core 40. Accordingly, the blanket material is disposed in the aforesaid area of relatively higher neutronic flux to increase the efficiency of transmutation of the fertile isotope into the corresponding fissionable isotope and to increase the importance of the isotope so produced in the sustenance of the chain-reaction. Therefore, as stated previously in connection with FIG. 1 of the drawings, a relatively flat reactivity curve throughout the life of the reactor core 40 is obtained. In one example of the invention, the blanket or fertile assemblies 42A contain collectively about 940 kilograms of natural or source grade uranium, while the enriched portion of the core comprises 1560 kilograms of uranium 238 enriched to four percent of $U^{235}$.

Figure 3:
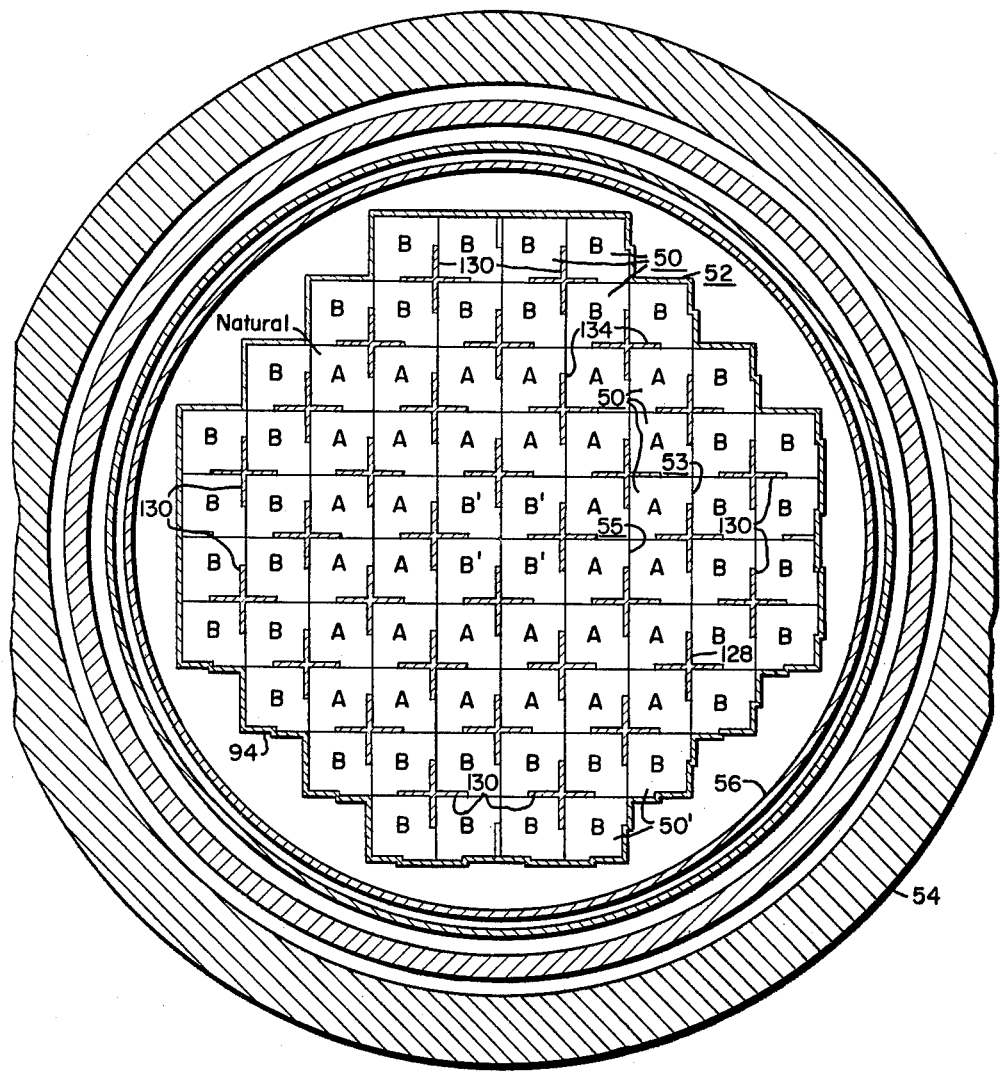
FIG. 3 is a top plan view of still another neutronic reactor core arrangement.

Referring now to FIG. 3 of the drawings, the reactor core loading arrangement illustrated therein is adapted for use with a relatively larger power reactor. In this loading arrangement, space is afforded for a larger number of enriched fuel assemblies and for additional assemblies of fertile material comprising in this example natural uranium. A total of approximately 76 fuel element assemblies 50 are utilized, with the assemblies 50B comprising the seed or enriched portion of reactor core 52, while the assemblies 50A comprise a blanket portion thereof. These fuel assemblies are supported within a core having an average diameter of 74.4 inches. The core structure 52 is supported within a suitable pressurized vessel 54, such as that mentioned heretofore but of appropriately larger size.

In this example, the blanket portion is designated by the fuel assemblies 50A as aforesaid and consists of 32 such assemblies which are arranged in concentric adjacent annuli 53 and 55 surrounding a central enriched core portion consisting of four fuel assemblies 50B'. The concentric blanket annuli are in turn encompassed by 40 additional enriched fuel assemblies 50B disposed adjacent a generally cylindrical casing 56 of the reactor core. These central and peripheral enriched portions (B' and B) of the core can be furnished with enriched fuel assemblies having the same or different percentage enrichments. In this latter example of the invention, it is evident that the blanket or lower enriched portion (A) of the core 52 is placed in a region of relatively higher neutronic flux within the core and in addition is disposed as closely as practical to the center thereof, commensurate with the number of blanket or fertile assemblies 50A employed. That is to say, the fertile assemblies 50A are arranged substantially at a region of greatest influence upon the chain-reaction being sustained within the reactor core 52. As pointed out heretofore, with this disposition of the blanket material, a more efficient conversion ratio thereof into one or more of the fissionable isotopes is obtained, and accordingly a relatively flat response in reactivity of the core throughout its lifetime is effected. Alternatively, it is contemplated that at least one of the central enriched assemblies 50B' can be replaced by fertile assemblies and/or that the outer annulus 53 of fertile assemblies can be replaced by an equivalent number of enriched fuel assemblies 50B. Obviously the fertile and enriched regions A and B (FIGS. 1 to 3) can contain one or more of the fertile isotopes having initially differing levels of enrichment, with that having the lower level of enrichment being mounted within the blanket region A.

Figure 4A:
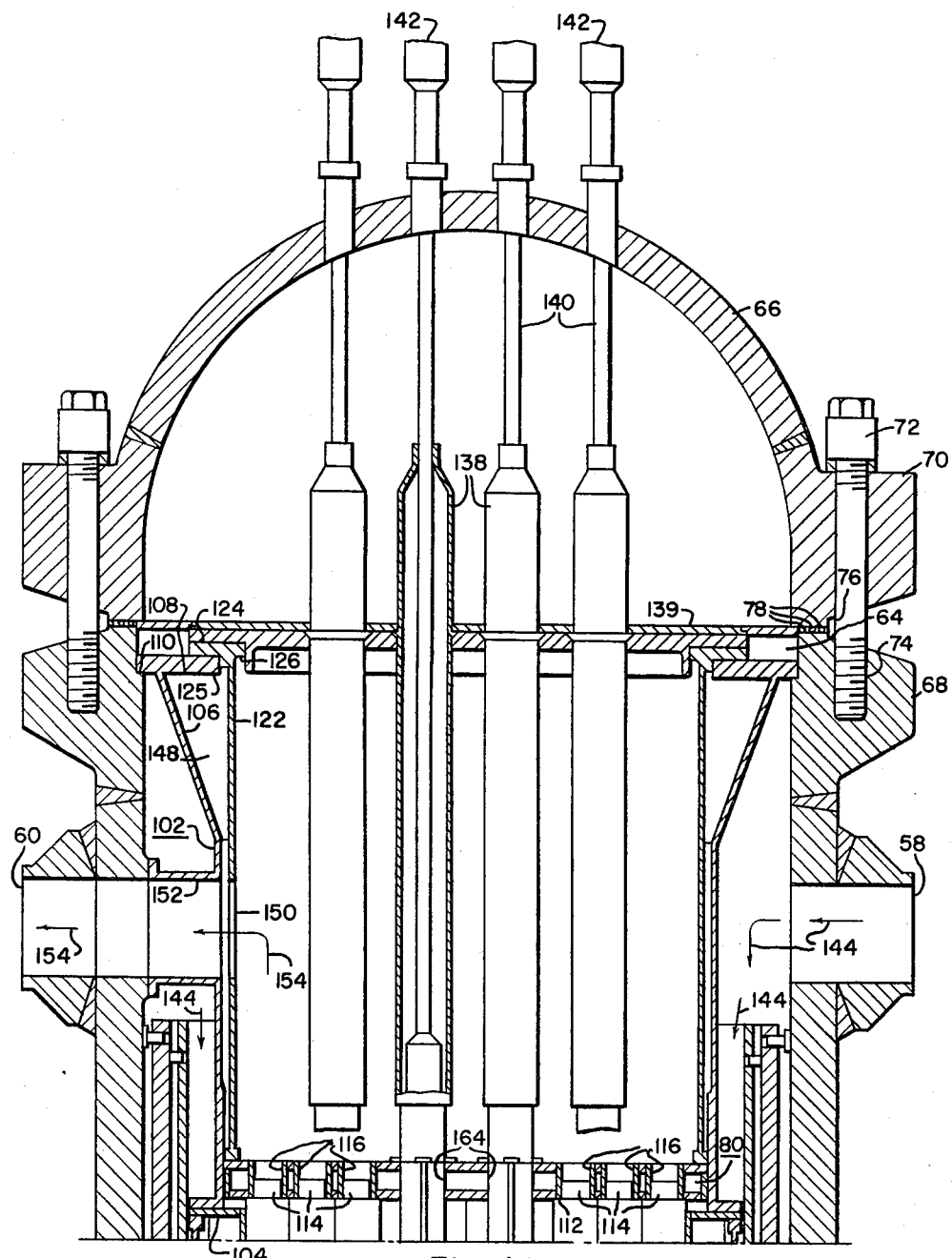
FIGS. 4A and 4B are a bipartite longitudinal sectional view of an exemplary heterogeneous reactor system employing the core loading arrangement of the invention.
Figure 4B:
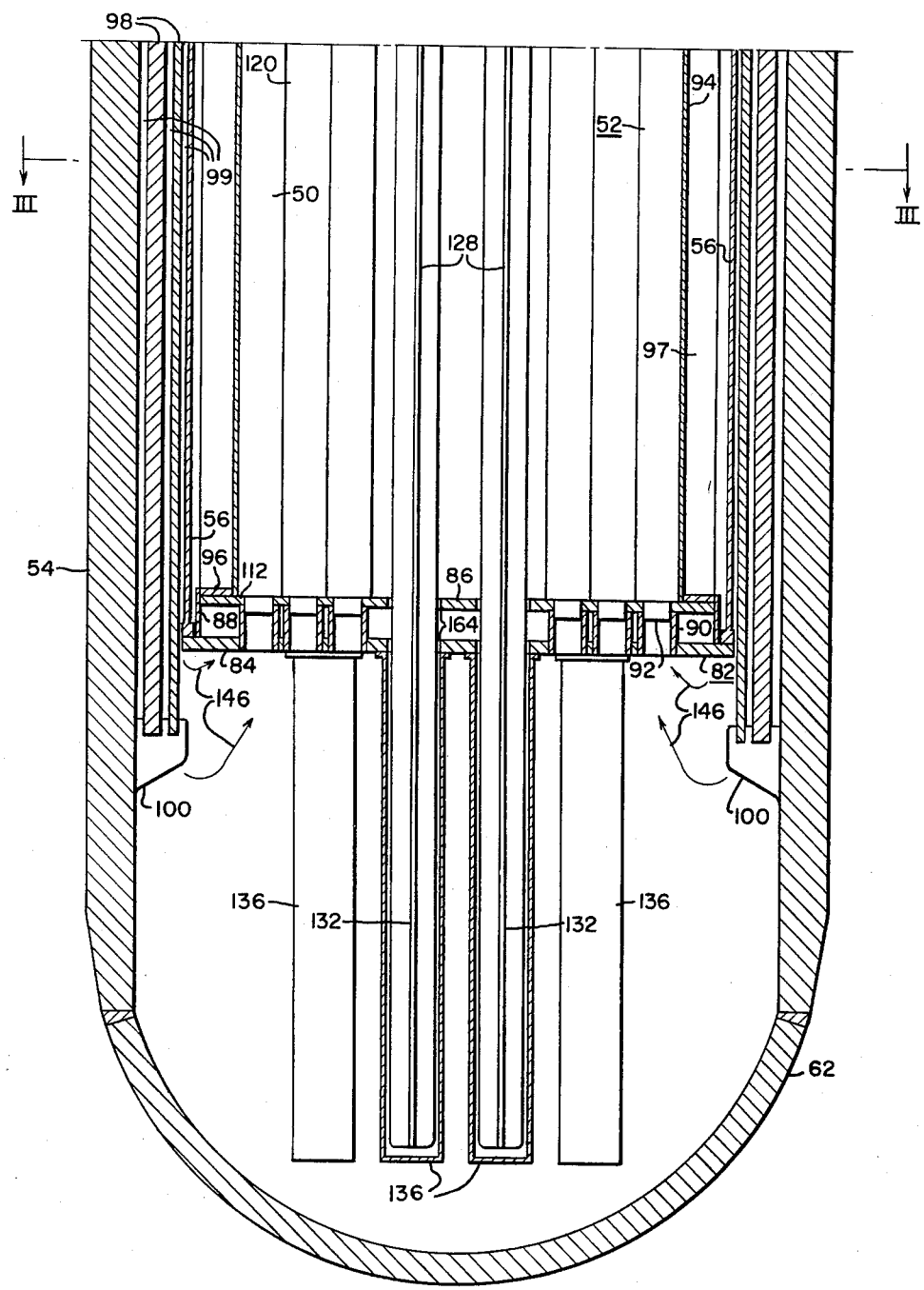
Figure 5:
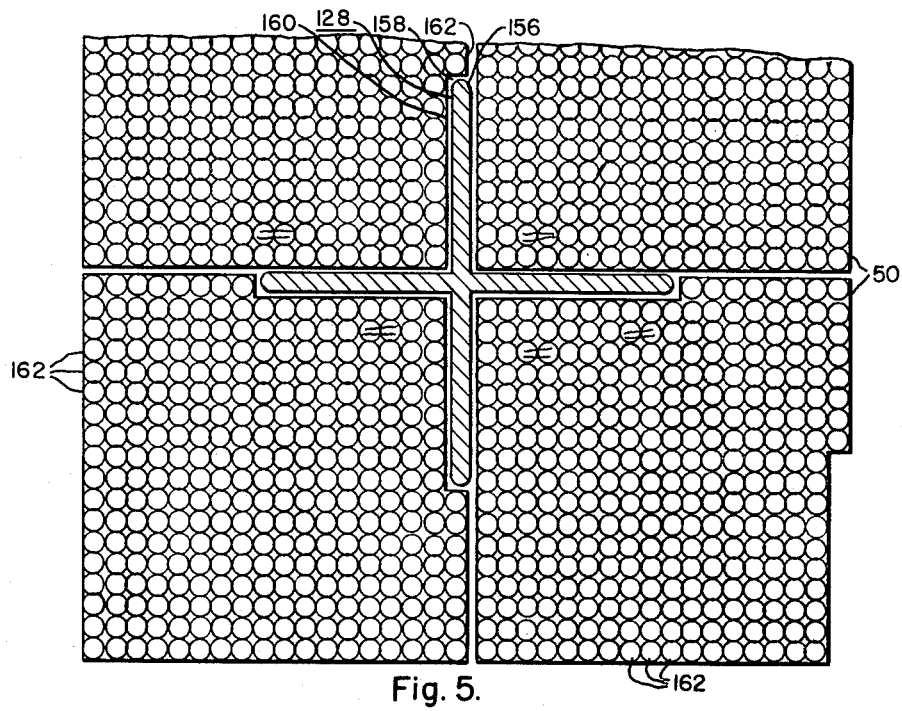
FIG. 5 is a partial top plan view of the reactor core illustrated in FIG. 4 and showing physical relationships between one of the control rods thereof and adjacent fuel element assemblies.
Figure 6:
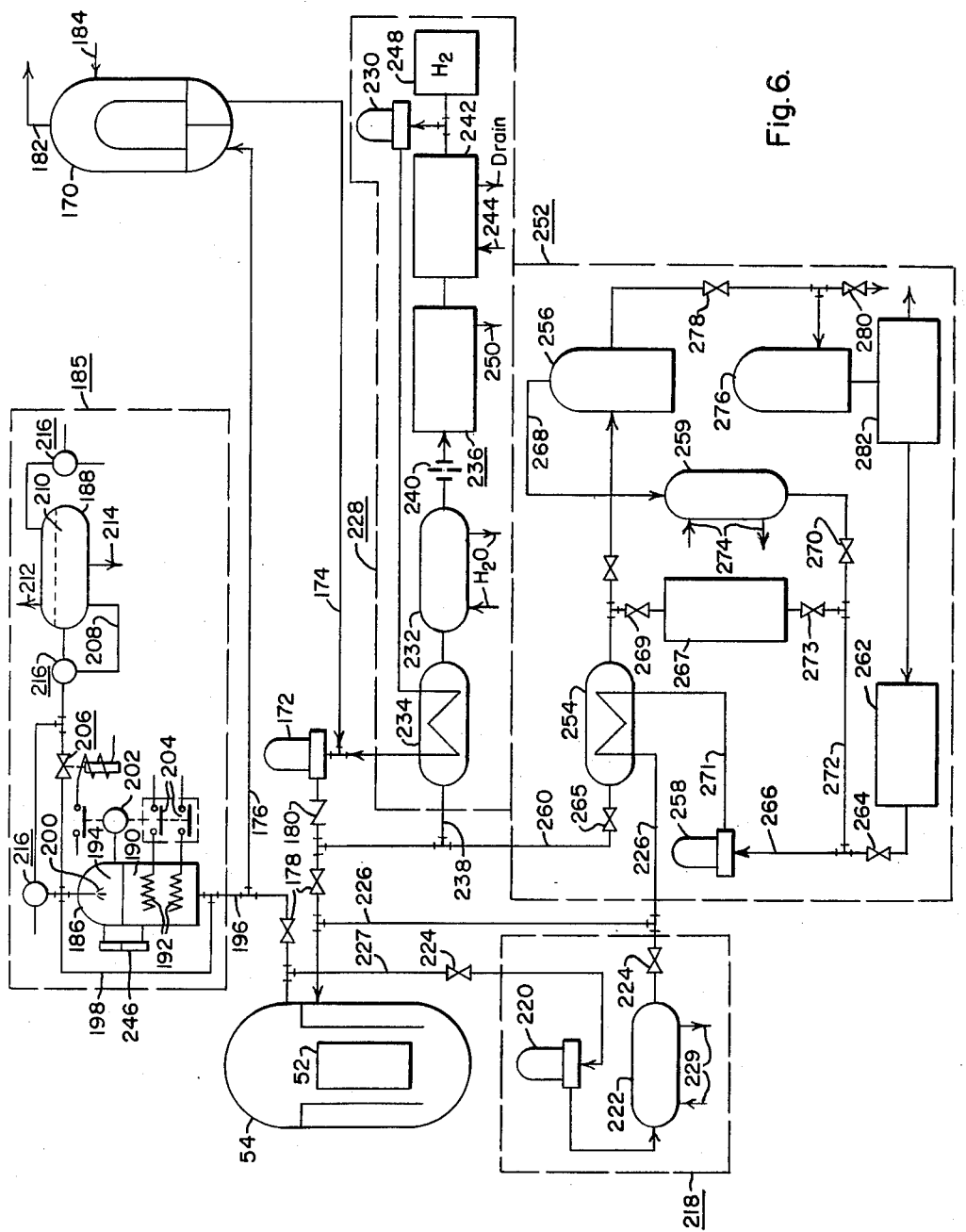
FIG. 6 is a schematic fluid circuit diagram of the reactor depicted in FIG. 4 and shown here in conjunction with one of the four cooling loops and with various auxiliary equipment.

The reactor core loading arrangement illustrated in FIG. 3 of the drawings and described heretofore is adapted for use in a heterogeneous type reactor system, one form of which is shown in detail in FIGS. 4 to 6 of the drawings. In this illustrative application, the reactor system includes the reactional vessel 54, which is provided with a plurality of inlet openings 58 and outlet openings 60. Each of the aforesaid openings are coupled in respective pairs thereof to four primary cooling or circulating loops, one of which is shown in the schematic arrangement of FIG. 6. The reactional vessel 54 is generally cylindrical in contour, but is provided with a lower spheroidal end section 62, and its upper opening 64 is closed with a full diameter head or closure 66. The vessel 54 and its head 66 are each fabricated with closure flanges 68 and 70, disposed respectively at their openings. The head flange 70 is provided with a plurality of apertures through which a number of mounting bolts 72 are inserted for threading into suitably positioned tapped holes 74 of the vessel flange 68. The junction 76 between the head 66 and the vessel 54 is sealed by a number of resilient O-rings 78, with three being employed in this arrangement, and fitted into a like number of grooves formed on one of the flanges 68 or 70. Additionally, the junction 76 desirably is hermetically sealed by means of a sealing weld or weld container extending continuously about the adjacent junction. This sealing weld is similar in structure to those described and claimed in a copending application of Kreh et al., entitled "Container End Structure," Serial No. 392, 692, filed November 17, 1953, and now Patent 2,805,789, issued September 10, 1957, and assigned to the present assignee.

In this arrangement, the reactional vessel 54 is fabricated with an inside diameter of approximately 109 inches and with an overall outside height in the neighborhood of 31½ feet. The wall thickness of the cylindrical portions of the vessel 54 is furnished in the order of eight inches to render the vessel capable of withstanding a maximum systemic operating pressure of 2500 pounds per square inch and a test pressure of 3750 p.s.i.g. The vessel head 66 and the bottom spheroidal end 62 are provided with correspondingly lesser thicknesses due to their configuration, which thicknesses in this case are of the order of five or six inches. The inlet and outlet conduits (not shown), secured to the inlet and outlet ports 58 and 60 of vessel 54 in a transverse plane about the periphery thereof, are furnished with an inside diameter of approximately eighteen inches and a wall thickness of about two inches.

The reactor core 52, which has been described heretofore in connection with FIG. 3 of the drawings, is supported within the reactional vessel 54 by means presently to be described. In this example, the reactor core 52 comprises the cylindrical cage member or barrel 56 and upper and lower core supporting plates 80 and 82, respectively. The lower core plate 82 is joined to the lower end of the cage member 56 by means of, for an example, a number of mounting bolts (not shown). The bottom supporting plate 82 comprises a pair of sheet members 84 and 86 which are rigidly joined in spaced relationship by an annular band 88 and a plurality of nozzle receptacles 90. The receptacles 90 are adapted to receive flow nozzles 92 of the fuel element assemblies 50, which also are presently to be described in greater structural detail. With this arrangement, the bottom plate 82 is furnished with considerable strength without unduly increasing its weight. A closely fitted sheath or baffle member 94 surrounds the outer periphery of the entire group of fuel element assemblies 50 and is secured to the bottom plate 82 and spaced from the cylindrical cage 56 thereof by means of a collar 96 fastened to the outer periphery of the upper side of the plate 82. Desirably, the core barrel 56 is removed outwardly of the sheath 94 to form an annular space 97 therebetween and averaging about 6 inches in its radial dimension. This space is filled with reactor coolant-moderator liquid during operation thereof, which space then serves as a peripheral neutron-reflector for the core 52.

In this example, the cage 56 is fabricated with a thickness of one inch and is spaced from the inward surface of the reactional vessel walls. In order to avoid corrosion, these walls together with the inside surfaces of the spheroidal end member 62 and of the closure 66 are clad with a corrosion-resistant material, such as stainless steel furnished in the order of ¼ inch in thickness. Disposed in the space between the cylindrical cage 56 and the inside surface of the walls of the reactional vessel are a pair of thermal shields 98. As indicated heretofore, these thermal shields operate to collect the peripheral neutrons emitted from the reactor core 52 and passing through the reflecting space 97 in order to prevent their impingement upon the adjacent wall surfaces of the reactional vessel 54 and the development of attendant thermal stresses therein. In furtherance of this purpose, the thermal shields 98 are formed with a thickness of 3 inches and 1½ inches, respectively. The thermal shields 98 and the cylindrical cage member 56 of the core and the adjacent vessel wall are spaced from one another in order to provide flow passages of 1 and 1½ inches therebetween, respectively. As will be described presently, through these passages flow the incoming cooling fluid after entering the reactional vessel 54 through the inlet ports 58.

The thermal shields 98 are supported upon a plurality of lugs or brackets 100 welded adjacent the lower end of the reactor vessel 54 to the inside surface of its cylindrical wall. The brackets 100 are spaced circumferentially from one another in order to afford communication of flow passages 99 with the interior of the reactional vessel 54.

The reactor core 52 is supported within the reactional vessel 54 by means of a supporting barrel 102 which is secured to a collar member 104. The collar 104 in turn is secured to the upward end of the core cage member 56 and the core tubular baffle member 94, which thus if supported between this upper collar member 104 and the lower collar member 96 noted heretofore. The upper end portion of the supporting barrel 102 includes a frustoconical section 106 which is secured to a supporting annulus 108. In the operating position as shown in FIG. 4 of the drawings, the supporting annulus 108 is inserted a short distance into the reactor vessel 54 whereupon it engages an annular shoulder 110 extending inwardly from the inner periphery of the vessel wall and adjacent the top opening 64 thereof. Thus, the core barrel 56 and the bottom supporting plate 82 of the core 52 together with the fuel assemblies 50 are suspended within the reactional vessel 54 by means of the supporting barrel 102 and its associated components.

The assemblies 50 are supported initially by their own weight against the upper surface of the bottom supporting plate assembly 82 and are positioned by means of shoulders 112 on the bottom flow nozzles 92 bearing against the lower plate assembly 82. Accordingly, the fuel element assemblies 50 having been mounted more or less freely within the core structure 52, can be withdrawn individually therefrom without removing the entire core structure after first opening the head 56 of the reactional vessel 54. Each of the assemblies 50 can be raised or lowered through the vessel opening 64 by means of a suitable tool (not shown) adapted to engage the upper flow nozzle shoulder 112 thereof.

In order to secure the fuel elements 50 in their operational position, the top core plate assembly 80 is lowered over flow nozzles 114 connected respectively to the upward ends of the fuel element assemblies 50. The upper core plate 80 is constructed in a manner similar to that described heretofore in connection with the lower core plate 82 and accordingly contains a plurality of nozzle receptacles 116, arranged in alignment with the receptacles 90 of the lower plate 82. When in position the lower surface of the upper core plate 80 engages the shoulders 112 of the upper flow nozzles 114 and therefore secures the fuel element assemblies 50 against vertical movement longitudinally of the reactional vessel 54. This arrangement is desirable inasmuch as the coolant circulated through the reactor vessel, in a manner to be presently described, is directed upwardly through the coolant flow passages of the reactor core 52.

The upper core plate 80 is maintained in its operating position or is raised or lowered relative thereto by means of an inner supporting cylinder 122, to the upper end of which is secured another supporting annulus 124. In this arrangement, the annulus 124 of the inner cylinder overlies the supporting annulus 108 of the outer supporting cylinder 102 and thus supports the inner cylinder 122 and the upper core plate 80 at the desired position thereof. The annuli 124 and 108 together with the components secured thereto can be readily withdrawn from the reactional vessel, upon removing the top closure 66 thereof, by means of a suitable lifting tool (not shown) adapted to engage the inwardly extending heel portions 125 and 126 of these annuli.

In this arrangement, the core structure 52 is approximately nine feet in overall height and the active surface thereof has an average diameter of approximately 74.4 inches. The core cage member 56 which is spaced from the core sheath 94 is a right cylinder having an inside diameter of about 91 inches while the inside diameters of the adjacent thermal shields 98 are 94 and 100 inches, respectively.

The reactor core structure 52 comprises, as aforesaid, a total of 76 fuel element assemblies 50, each of which is composed of approximately 305 fuel rods 162 assembled in a square lattice between stainless steel end plates. Suitable apertures are provided in each of the end plates to permit a flow of coolant between and parallel with with these fuel rods. Each of the fuel rods 162 is approximately 117 inches in length and has an outside diameter of .335 inch. Inserted within each rod are a plurality of cylindrical uranium oxide ($UO_2$) cylinders or pellets having a nominal diameter of .30 inch and totaling 102 inches in length. The uranium oxide pellets are enclosed within a corrosion-resistant material such as stainless steel tubes having a thickness in this example of .0175 inch. Suitable end plugs are welded into tubes to completely isolate the uranium oxide pellets from the reactor coolant. To the ends of the assembly thus formed are secured the flow nozzles 114 and 92, respectively. The structural details of one form of fuel element assembly 50, employed herein, is described in a copending application of Erling Frisch and William E. Strutz, entitled "Rod-Type Fuel Assembly," Serial No. 620,071, filed November 2, 1956, and now Patent 3,015,616, issued January 2, 1962, and assigned to the present assignee. Accordingly, a more detailed description is presently unnecessary.

A total of 23,218 fuel rods are utlized in the reactor system illustrated in FIGS. 3 to 6, which rods together furnish a heat transfer area of approximately 17,300 square feet. These fuel rods 162 collectively contain 24,400 kilograms of uranium in the form of the dioxide ($UO_2$). In the exemplary fuel loading arrangement of FIG. 3 of the drawings, the enriched portion (B) comprises approximately 14,900 kilograms of uranium having relatively low enrichment for example in the range of 1% to 10%, with about 4.0% being most desirable for the parameters given herein. In this respect, however, the guiding principle is that the percentage enrichment be sufficient to intiate the chain reaction but not so high as to induce deleterious neutron leakage from the core structure. On the other hand, the blanket portion (A) of the core contains 9,500 kilograms of source grade uranium. With this arrangement, then, the core is designed for a calculated reactivity lifetime of about 10,000 hours and a maximum power output in heat of 480 megawatts.

Although the seed material is disposed at the periphery of the reactor core 52, neutronic leakage therefrom is minimized by employing a relatively low percentage enrichment as aforesaid. In addition, the seed of low enrichment introduces additional fertile isotope into the core 52 and thus further improves the conversion efficiency of the reactor. Moreover by not using areas or zones within the reactor having vastly differing percentages of enrichment a more reliable core with more uniform characteristics is obtained, as compared to previously employed or suggested designs. For example, the arrangements of FIGS. 1–3 can be employed to minimize flux perturbations and hot channel factors, by suitably adjusting the percentage enrichment to meet these conditions. Thus it is contemplated that a third zone (not shown) of intermediate enrichment can be disposed between the fertile and seed assemblies, that is to say in a position of lesser importance to propagating the chain reaction as compared to the fertile assemblies but of greater importance as compared to the higher enriched seed assemblies. It is also contemplated that some or all of the fertile assemblies of FIGS. 1–3 can be replaced with slightly enriched fuel assemblies, still having a lesser percentage enrichment than that of the seed assemblies and of the aforesaid intermediate assemblies if used for the purposes of this invention.

Another advantage in employing increasing, but relatively low, enrichments toward the outer periphery of the reactor core is that during the normal life-span of the core sufficient fissionable isotope is generated within the central, or relatively lower enriched or fertile regions of the core to have a significant effect upon the reactivity of the entire core. Thus the curve of reactivity vs. core life-time is flattened and the life cycle of a given core is prolonged. This would not be the case with highly or fully enriched seed arrangement for the change in fissionable isotope content of the fertile areas would be insignificant positionally, insofar as a core containing a highly enriched seed were concerned.

Finally, by using core areas, all of relatively low, fissionable isotope content, adequate heat exchanging surface is provided in the reactor core with the result that hot spots are minimized within the reactor core, so that the reactor is capable of operation at much higher power levels.

In this system, the reactor is controlled by means of twenty-four control rods 128 and eight shim rods 130, with the shim rods being arranged for insertion into the core adjacent the outer periphery thereof (FIG. 3). The control rods and shim rods 128 and 130 are arranged collectively to terminate the chain-reaction sustained within the reactor core 52 and thus comprise a material such as boron or cadmium capable of absorbing the thermoneutrons which are instrumental in propagating the chain-reaction, as foresaid. Additional control of the reactor is afforded by provision of suitable means for adding a solution of a boronic compound, or the like, into the reactor coolant stream when it is desired to shut down the reactor.

Each of the control rods and shim rods has an extension 132 fabricated desirably from a material having a low neutronic capture cross section and coupled to its lower end. These extensions are drawn into the reactor as the control rods 128 are withdrawn in order to minimize hot spots within the reactor core 52 which otherwise would be caused by neutronic fluxile peaking within the vacated control rod channels 134 (FIG. 3). When the control rod assemblies are fully inserted within to the reactor core 52, their extensions are encompassed by shroud tubes 136 secured to the under surface of the lower core supporting plate 82. On the other hand, when the control rods are withdrawn from the reactor core they in turn are enclosed within guide tubes 138 secured to the outer surface of the upper core plate 80. The guide tubes 138 are positioned laterally by an upper horizontal plate 139 having suitable apertures through which the guide tubes extend.

The control rods 128 and shim rods 130 are operated by means of vertically or longitudinally movable driving shafts 140. These driving shafts enter the head 66 of the reactional vessel 54 by means of housings 142 hermetically sealed at appropriate openings in the closure 66 and communicating with the interior of the reactor vessel 54. The drive shafts 140 are operated upwardly or downwardly as desired by means of individual linear motion devices (not shown) likewise disposed within the sealed housings 142. Suitable linear motion devices for this purpose are described in an application of Walter G. Roman and Robert C. Robinson, Serial No. 496,688, entitled "Linear Motor," filed March 25, 1955, and now Patent 2,780,740 issued February 5, 1957, and assigned to the present assignee.

Referring now to FIG. 5 of the drawings, the dimensional relationships between the control rods 128 and the fuel elements 50 are illustrated therein. In this example, the control rods 128 are fabricated in a cruciform configuration, the arms 156 of which are inserted in closely fitting channels 158 formed by offset portions 160 of the aforesaid fuel element assemblies 50. The transverse dimension of the control rod 128 is approximately 7.8 inches while that of the channel is approximately 7.9 inches in order to provide a desirable amount of clearance. The offset portions 160 of the fuel element assemblies are afforded as a result of eliminating a portion of an adjacent outer row of the rod-type fuel elements 162. The control rods 128 are guided within the channels 158 by means of closely fitting cruciform slots 164 (FIG. 4) formed in the upper and lower plates of the core structure 52. With this arrangement it is seen that each of the fuel element assemblies 50 is positioned between a pair of control rod channels 158 arranged at diametric corners thereof, with the exception of the peripheral assemblies 50′ (FIG. 3).

Each of the control rod arms 156 (FIG. 5) is approximately .29 inch in thickness whereas the adjacent channel portions 158 are made approximately .53 inch in order to provide the necessary clearance. Similarly, each of the fuel element assemblies 50 measures nominally 7½ inches in the transverse direction and contains in this arrangement eighteen fuel rods 162 in one unbroken outer row. The fuel rods 162, in order to provide the necessary flow passages therebetween, are mounted on approximately 0.43 inch centers to form a square lattice. The control rod absorbing material contained within the cruciform control rod 128 coextends with substantially the active height of the core structure 52 or about 102 inches, which is the combined length of the aforesaid uranium oxide pellets. In this arrangement the thermoneutron-absorbing material is hafnium.

In order to remove the heat developed by the chain-reaction within the reactor core 52, a suitable coolant is circulated through the aforementioned flow passages of the core structure 52. This coolant material, which is ordinary water in this case, also serves as the moderator material provided for the chain-reaction being sustained within the core. The moderator-coolant is circulated by the aforesaid coolant loops and thus enters the inlet ports 58 (FIG. 4A) of the reactional vessel 54 and is directed downwardly through the flow passages 99 existing among the thermal shields 98 and the reactor core casing 56 by means of the generally cylindrical outer supporting member 102, as indicated by flow arrows 144. After issuing from the flow passages 99, the incoming reactor coolant then flows, as indicated by flow arrows 146 upwardly through the core 52 by means of the flow nozzles 92 and 114 secured to bottom and top ends, respectively, of each fuel element assembly 50. Thence, the reactor coolant flows into the annular space 148 confined between the reactor core supporting member 102 and the inner supporting member 122, by means of a number of apertures 150 formed in the wall of the inner supporting member 122. Each outlet port 60 communicates with the aforesaid annular space 148 by means of a connecting conduit 152 secured to the outer supporting cylinder 102 and forming a close fit with the inner wall surface of the reactional vessel 54 at an area adjacent the outlet conduits 60, respectively. Thus, the reactor coolant issuing from the top flow nozzles 114 of the individual fuel element assemblies 50 flows outwardly of the reactional vessel 54 by means of the conduit 152 and the outlet conduit 60, as indicated by flow arrows 154 with little or no contact with the incoming coolant.

Referring now to FIG. 6 of the drawings, the reactor vessel and associated components described heretofore in connection with FIGS. 3 to 5 of the drawings are illustrated in connection with primary coolant loop circuitry and associated auxiliary equipment. In this arrangement, four primary cooling or circulating loops are utilized, and each includes a steam generating heat exchanger 170, a primary coolant pump 172, and associated inlet and outlet conduits 174 and 176, respectively. These latter-mentioned conduits desirably are of the same size as the inlet and outlet ports 58 and 60 of the reactional vessel 54, that is to say approximately 20 inches in inside diameter at a wall thickness of two inches. In order to minimize corrosion within the system, the conduits 174 and 176 as well as the other components of the primary circulating system are fabricated from a corrosion resistant metal, such as stainless steel. The primary circulating pump 172 is preferably of the submersible or canned-motor type, such as that described in the copending application of Cametti and Hagg, entitled Totally Enclosed Canned Motor-Pump, Serial No. 440,628, filed July 1, 1954, and now Patent No. 2,887,061, issued May 19, 1959, and assigned to the present assignee.

The aforesaid conduits are coupled to the inlet and outlet ports 58 and 60 respectively of the reactor vessel 54 (FIG 4). The other circulating loops (not shown) are connected to similarly provided inlet and outlet ports, which are disposed adjacent the ports 58 and 60. Each primary circulating loop can be isolated from the reactor system by a pair of stop valves 178 disposed respectively in the aforesaid inlet and outlet conduits. As an additional precaution, a check valve 180 is provided in the inlet conduit 174 between the reactor vessel 54 and the pump 172 to prevent coolant from flowing backward into the pump 172 in the event of pump failure or other contingency.

The steam generator 170, in this example, is a vertical U-tube type heat exchanger having a steam exit conduit 182 and a feed water or condensate conduit 184. One form of U-tube type steam generator is described in copending application of W. A. Webb et al., entitled "Remote Equipment Maintenance," Serial No. 659,002, filed May 14, 1957, assigned to the assignee of the present application, and subsequently abandoned. However, any suitable steam generator can be utilized which provides the necessary heat transfer area.

In order to bring the reactor system to its operating pressure of nominally 2,000 pounds per square inch and to maintain the system within approximately 150 pounds of its nominal operating pressure, a pressure control and relief ystem, indicated generally by the reference character 185, is provided. This system is coupled to the outlet conduit 176 of one of the primary circulating loops and comprised a pressurizing vessel 186, a discharge tank 188, and suitable relief valves presently to be described. The pressurizing vessel 186 has a capacity of about 260 cubic feet and normally contains about 175 cubic feet of the primary reactor coolant in the lower portion 190 of the pressurizing vessel. The liquid thus contained within the vessel is heated by a plurality of electric emersion heaters indicated generally by the reference character 192. In this manner, the liquid portion 190 of the vessel is heated until the steam comprising the vapor space 194 of the vessel reaches a temperature of about 636° F. or the temperature corresponding to 2,000 pounds per square inch absolute. The pressure exerted by the steam then forces a portion of the liquid contained within the pressurizing vessel 186 downwardly through a conduit 196 which couples the lower portion of the pressurizing vessel 186 with the outlet conduit 176. Liquid continues to flow from the pressurizing vessel 186 to the associated circulating loop until the circulating loop and other portions of the reactor system are brought to a nominal operating pressure of 2,000 pounds per square inch.

The four circulating loops of the reactor system are arranged to circulate approximately 37,000,000 pounds per hour of total coolant flow through the reactor vessel 54. In this arrangement, the coolant enters through the inlet ports 58 at a temperature of 487° F. and is removed from the vessel after circulating through the core 52 at a temperature of 520° F. The heat thus gained by the circulating coolant is utilized in the steam generating heat exchangers 170, where steam is produced from secondary cooling water at a pressure of 500 pounds per square inch with a corresponding temperature of 467° F. Approximately 469,750 pounds per hour of steam is produced collectively by the steam generators 170, which steam is exited through the conduits 182 to external applications, for example, suitable thermodynamic machinery (not shown) for generating electricity. The condensate or spent steam is returned to the steam generators 170 at a temperature of approximately 340° F. through the feed water conduits 184 of the steam generator. The total pressure drop in the primary coolant system is 63 pounds per square inch and the coolant velocities are 32½ and 34 feet per second respectively at the inlet and outlet ports of the reactor vessel 54. With the heat and material balance shown, the reactor system illustrated in FIG. 6 is capable of a maximum heat output of approximately 480 megawatts and a net electric output in the neighborhood of 134 megawatts. This corresponds to an overall plant efficiency of 27.9 percent.

The pressurizing system is designed to limit the reactor system pressure to less than 2,150 p.s.i. in the event of a sudden reduction from full load on the electrical generating equipment. This reduction of load causes an increase in coolant temperature and volume, inasmuch as less heat is being extracted from the steam produced in the steam generators. The increased volume thus causes water to flow from the associated outlet conduit 176 into the pressurizing vessel 186 via its conduit 196. A part of this incoming or surge liquid is diverted through a connecting conduit 198 to a spray nozzle 200 or other heat exchanging means located in the vapor space 194 of the pressurizing vessel which in turn minimizes or counteracts the increase in volume or pressure.

A decrease in temperature and volume, due on the other hand to load increases, causes coolant liquid to flow from the pressurizing vessel through the conduit 196 and into the reactor system. The pressurizing system is arranged to maintain a minimum pressure of approximately 1,850 pounds per square inch during the aforesaid increases in load. In furtherance of this purpose, a pressure sensing device located generally at 202, is coupled to the steam space 194 of the pressurizing vessel 186 and is arranged to energize at least some of the heating elements 192 by the means of electric switches 204 and suitable well-known electrical circuitry (not shown). The resulting vaporization of the liquid portion 190 of the pressurizing vessel 186, of course, increases the steam pressure in the vapor space 194 of the vessel and consequently the operating pressure of the reactor system.

The pressure sensing device 202 is also coupled by suitable electrical circuitry (not shown) to a solenoid operated relief valve 206 whereupon a portion of the steam contained within the pressurizing vessel is emitted into the discharge tank 188 when the system pressure increases beyond 2,150 pounds per square inch. The steam is conducted through a conduit 208 to the liquid portion 210 of the discharge tank 188 where at least part of the steam is condensed upon contact with the liquid portion. The steam is not vented directly to the atmosphere inasmuch as it is conceivable that radioactive, gaseous fission-products can accumulate within the vapor space 194 of the vapor pressurizing vessel. When it has been determined that the gases accumulated within the discharge tank 188 have a sufficiently low level of radioactivity, these gases can be vented to the atmosphere by means of the conduit 212. Any waste material accumulated within the liquid portion of the discharge tank 188 is conducted through a conduit 214 to suitable waste disposal means. The pressurizing vessel 186 and the discharge tank 188 are each provided with suitable relief valves indicated generally by the reference characters 216 which are designed to vent the system directly to the atmosphere in the event that the steam pressure exceeds a maximum allowable pressure of 2,500 pounds per square inch.

The emersion heaters 192 are furnished with a total heating capacity of 585 kilowatts all of which is utilized to heat the liquid contained within the pressurizing vessel when the reactor system is being brought to operating pressure. Of this total capacity, only a 22 kilowatt bank of heaters is energized on a continuous basis. A second 22 kilowatt bank of these heaters is operated intermittently, as controlled by the pressure sensing device 202, in order to maintain the operating pressure at the nominal 2,000 pounds per square inch absolute.

Each of the steam generators 170 of the respective circulating loops are installed with sufficient elevation above the reactor core 52 to obtain a natural circulation in the primary loops in order to remove decay heat from the core 52 when the reactor system is shut down for any purpose. This heat produces steam in the secondary system including the steam side of the steam generator 170, which steam can be blown to the atmosphere or utilized for various auxiliary purposes. The steam generators 170, which in this example are approximately 75 inches in diameter are about 45 feet in height, contain collectively sufficient water to remove decay heat from the reactor core for a period of one to two hours without makeup water. Accordingly, in the event of power failure, the reactor system can be cooled to a safe temperature without requiring the use of any pumps.

During refueling of this system, at which time the reactor vessel closure 66 is removed, water cannot be circulated through the primary coolant loops. Under these conditions the aforesaid decay heat is removed with an auxiliary shut down cooling system indicated generally by the reference character 218. The shut down system includes an auxiliary pump 220 and a heat exchanger 222 which are coupled, in series with stop valves 224, through conduits 226 and 227 coupled respectively across the inlet and outlet conduits 174 and 176 of one of the primary circulating loops. Cooling water from a suitable source (not shown) is furnished to the heat exchanger 222 through the inlet and outlet conduits 229.

During the operation of the reactor system, the total volume of water being circulated through the primary loops is maintained essentially constant and corrosion products are removed therefrom by means of the purification and volume control system indicated generally by the reference character 228. This control system includes a canned-motor pump 230, a heat exchanger 232, a regenerative heat exchanger 234, and a demineralizer or ion-exchange unit, denoted generally by the reference character 236. In the operation of this system, a limited amount of the coolant circulating through one of the primary loops is bled therefrom by means of a conduit 238, and the amount flowing therethrough is determined by an orifice or other constriction 240. The primary coolant removed from the circulating loop is cooled to approximately 130° F. by the combined action of the regenerative and non-regenerative heat exchangers 234 and 232, respectively, and thence is passed through the demineralizing unit 236. A continuous flow of 60 gallons per minute is maintained through the purification and volume control system in this arrangement. From the demineralizer 236 the coolant liquid flows to a storage tank 242 where makeup coolant is added to the tank and to the reactor system by means of an inlet conduit 244. The amount of makeup liquid to be added is determined by the liquid level within the pressurizer vessel 186, as determined by the liquid level indicator, denoted generally by the reference character 246.

In order to minimize the corrosiveness of the high temperature water circulating through the reactor system, a solution of hydrogen in excess of the equilibrium amount is maintained in the primary coolant, which hydrogen minimizes the corrosion of the stainless steel which is contacted by the coolant. This hydrogen is introduced into the purification and volume control system by means of a hydrogen injectional system indicated generally by the reference character 248. The injection system 248 includes a pressurized hydrogen source (not shown) and a suitable injection means, such as that described and claimed in a copending application of Sylvester A. Weber, entitled Hydrogen Gauge, Serial No. 638,847, filed February 7, 1957, and now Patent 3,060,-726, issued October 30, 1962, and assigned to the present assignee. The coolant liquid then containing hydrogen is forced into the high pressure system with suitable charging pumps (not shown).

The portion of primary liquid treated within the purification and volume control system 228 is returned by the auxiliary pump 230 to the suction side of the associated primary coolant pump 172 after first passing through the regenerative heat exchanger 234. In this manner part of the heat removed from the coolant liquid entering the system 228 is retrieved. The waste products removed by the purification of the volume control system 228 is conducted from the demineralizer 236 by a conduit 250 to suitable shielded waste storage means. With the arrangement shown, the impurities in the primary coolant circulating through the reactor vessel 54 is limited to one to two parts per million. This low concentration of corrosion products is essential due to the fact that the induced radioactivity of these corrosion products is comparatively long-lived and would interfere with maintenance of the reactor system, if these products were permitted to accumulate or to circulate within the reactor system. Removing these products on a continuous basis therefore contributes to relatively easy equipment maintenance, inasmuch as that radioactivity induced in the coolant water itself decays very rapidly after shut down whereupon personal access can be had to most of the reactor systemic components within several hours.

As indicated heretofore an auxiliary shut down system, denoted generally by the reference character 252, is provided for injecting a quantity of neutron-absorbing poison, for example, a water soluble boronic compound, into the reactor coolant system. The auxiliary shut down system is also arranged for the gradual removal of the soluble poison during start up of the reactor system. In furtherance of this purpose, the auxiliary shut down system includes a regenerative heat exchanger 254, a flash tank 256, a canned-motor pump 258, and a condenser 259. The auxiliary shut down system is coupled to one of the primary loop conduits by means of a conduit 260 and the conduit 226.

When the auxiliary system 252 is employed for injecting a concentrated solution of the poison into the associated primary loop, which poison is contained in a storage tank 262, stop valves 264 and 265 are opened. These stop valves are disposed respectively in a conduit 266 connecting the storage tank 262 to the pump 258 and in the aforesaid conduit 260; and when the pump 258 is operated, the contents of the concentrated poison storage tank 262 is pumped into the inlet conduit 174 of the associated primary loop, by means of the conduit 226, after first passing through the regenerative heat exchanger 254. The regenerative heat exchanger is provided in order to conserve heat and to minimize thermal shock imparted by the concentrated poison entering the primary coolant loop through the conduit 226. At the same time an equivalent amount of primary coolant is withdrawn upstream of the entering poison and this amount, after passing through the regenerative heat exchanger 254, is piped to a storage tank 267 upon opening stop valve 269.

When starting up the reactor system, the stop valve 265 in the conduit 260 is opened whereupon a small portion of primary coolant is bled from the inlet conduit 174 of the associated primary loop and flows through the regenerative heat exchanger 254 to the flash tank 256. In the flash tank 256 a substantial proportion of the system pressure is removed from the primary coolant, and the vapor thus produced is conducted out of the flash tank 256 through a conduit 268 to the condenser 259. After opening a stop valve 270, the primary coolant which is liquefied in the condenser 259 then is conducted to the suction side of the auxiliary pump 258 through a conduit 272. While the poison is thus being removed from the reactor system, the valve 264 of course is closed to prevent withdrawal of poison from the concentrated poison storage tank 262 and the condensed primary coolant is pumped back into the primary circulating loop through the conduits 271 and 226, and the regenerative heat exchanger 254, by means of the pump 258. At the same time, the aforesaid condensed primary coolant is supplemented by coolant previously withdrawn from the reactor system and stored in the storage tank 267. The contents of the tank 267 is conducted through the conduit 272 to the pump 258 upon opening valve 273. Cooling water from a suitable source is furnished to the condenser 259 by means of inlet and outlet conduits 274.

The dilute poison solution remaining within the flash tank 256 is pumped to a dilute poison storage tank 276 or to suitable waste storage means as determined by the operation of valves 278 and 280, respectively. From the dilute poison storage tank 276, the solution flows to an evaporating unit 282 where the poison solution is concentrated for storage in the storage tank 262, as aforesaid.

The reactor plant comprising the aforedescribed reactor system is installed in a sealed, spherical vapor container (not shown) of approximately 125 feet in diameter. The container is constructed of carbon steel and has a wall thickness of about 1 inch, whereby the vapor container is adapted for confining a pressure of approximately 36 pounds per square inch gauge. The container is designed for retaining all of the water vapor which would be released in the event of a major rupture in the primary coolant system. Inasmuch as a number of fuel element failures might accompany this contingency with an attendant release of highly radioactive fission gases, it is highly desirable to delay releasing the gases, then confined within the vapor container until their radioactivity has decayed to acceptable levels.

The reactional vessel 54 and the primary circulating loops are provided with suitable concrete shielding components such as those described in the copending application of William A. Webb et al., entitled Shielded Reactor Plant Arrangement and Personnel Access Means Therefor, Serial No. 659,004, filed May 14, 1957, and now Patent 3,113,915, issued December 10, 1963, and assigned to the present assignee.

The fuel element assemblies 50 supported within the reactional vessel 54 can be removed and inserted for refueling purposes by employing a suitable storage canal (not shown) and a fuel assembly chute or transfer mechanism such as that described and claimed in a copending application of Erling Frisch, Serial No. 611,303, filed September 21, 1956, entitled Transfer Mechanism for Nuclear Reactors, and now Patent 3,058,900, issued October 16, 1962 and assigned to the present assignee.

As described in the last-mentioned copending application, the transfer mechanism communicates with the reactional vessel and with the aforesaid canal, and is located adjacent the reactor vessel for the purpose of transferring fuel elements from the vessel to the canal for temporary storage. During operation of the reactor system, one or more pressure tights seals are associated with the transfer mechanism in order to isolate the reactional vessel from the canal. During refueling, water to the depth of approximately 10 feet, is maintained above the upper supporting plate 80 of the reactional core, in order to afford biological shielding for personnel adjacent the opening 64 of the reactional vessel. As indicated heretofore, the fuel element assemblies 50 can be removed one at a time for transportation to the canal through the aforesaid transfer mechanism or alternatively the entire core structure 52 together with the fuel element assemblies can be removed from the reactor vessel for transportation by other suitable means (not shown) to the canal or to a hot cell for disassembly and maintenance.

Figure 7A:
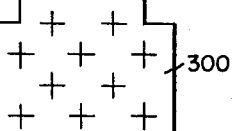
FIGS. 7 and 7A are a graphical illustration of neutronic fluxile distribution in a conventional, uniform reactor core.
Figure 7:
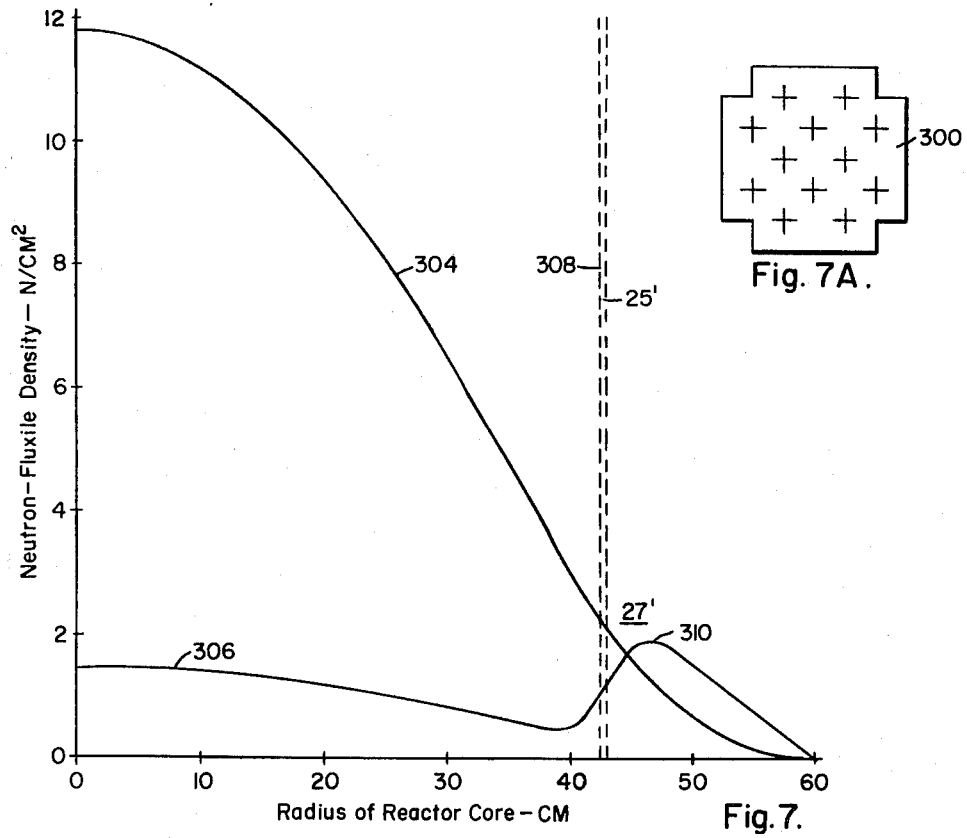

Referring now to FIGS. 7 to 13 inclusive, the effects of various core loading arrangements of the invention, upon fast and slow (thermal) neutronic fluxile density are shown in comparison with those of a conventional, enriched uniform core loading 300 (FIG. 7A) and a conventional converter type core arrangement 303 (FIG. 8A), which has the natural uranium or fertile material 301 (FIG. 8A) surrounding the seed portion 302 consisting of enriched uranium. In the case of the uniform core (FIG. 7A), which otherwise has the same configuration as that of FIG. 1, the density of fast and slow neutrons vary with the radius of the core in the manner shown respectively by curves 304 and 306 (FIG. 7). The vertical axis of the core, of course, is designated by the coordinates O-O, while the vertical dashed lines 308 denote the core sheath 25' (FIG. 1). Thus it is seen that the total neutronic flux of a uniform core varies with it radius substantially in accordance with a cosine curve as described more fully hereinafter. However, an anticipated amount of flux-peaking occurs within the reflector volume 27' as shown by a prominence 310 of curve 306.

A reference to FIG. 8 of the drawings exemplifies a similar state of affairs attaining in a conventional converter core loading (FIG. 8A), with the exception that the slope of the curve 304' is much steeper. Thus, the total neutronic flux is still more concentrated at the center of the core. It should be noted at this point that all of FIGS. 7 to 13 represent initial operating conditions of the individual cores depicted in FIGS. 7A to 12A. A vertical dashed line 312 (FIG. 8) represents the average boundary between the enriched portion 302 and the outer or blanket portion 301 of the conventional converter-type reactor core 303. Due to the lesser rate or thermoneutronic absorption in the natural uranium or blanket section, another prominence 354 is observed in the associated curve 306' at a position within the blanket section and adjacent the boundary 312.

Since the majority of neutrons emitted in each fissioning of a $U^{235}$ atom are of fast velocities, it is obvious that the rate of nuclear burn-up is greatest at or adjacent the center or peak of the fast neutron curve 304', and by the same token this area exerts the greatest influence upon propagating the chain reaction. In a conventional converter-type reactor then, the additional fuel which is bred, as aforesaid, in the outer or fertile portion 301 thereof has a comparatively minor effect upon the reactivity of the core throughout its lifetime, as shown hereinafter in connection with FIG. 13. On the other hand, in the reactor core arrangement of FIGS. 7 and 8, a burnable poison had to be added to control the excess reactivity of the enriched fuel portion adjacent the core's center. The high fluxile densities adjacent the center of the core resulted in rather uneven burn-up of the fissionable isotope.

Referring now to FIGS. 9–12, inclusive, the variations in neutronic fluxile density occasioned by the improved reactor core loading arrangements of the invention are shown therein. In FIGS. 9 and 10 (FIG. 1) the peak 314 of each curve 316 is shifted away from the center of the core, and shows an attendant shift in area of highest reactivity in the initial stages of the core life cycle. In those core arrangements illustrated in FIGS. 9A and 10A and arranged according to the invention, the fertile or blanket portion 318 of the core 320 or 322 is clustered about the core's center, while the enriched area 324 of each core surrounds the blanket portion 318 and is disposed outwardly thereof. A vertical dashed line 326 of each graph (FIG. 9 or 10) represents the boundary between the blanket portion 318, which can be an area of relatively lower enrichment, and the seed or enriched portion 324, which can be an area of relatively higher enrichment.

The peak 328 of each thermoneutronic curve 330 (FIG. 9 or 10), represents the relatively increased thermal or slow neutronic flux which is available for transmuting blanket or fertile isotope into fissionable isotope in accordance with the aforedescribed nuclear reactions. However, as this new nuclear fuel is produced, it can be readily seen that it will occupy a position of greatest importance for carrying on the chain reaction, viz., the area adjacent the center of the core. Thus, as explained previously, a relatively flat reactivity curve vs. core lifetime (not shown) is attained even though less fuel is bred than is consumed. In the arrangements made pursuant to the invention and illustrated herein, it has been found necessary to add little or no burnable poison, which is quite contrary to the conventional arrangements of FIGS. 7A and 8A.

In the modifications illustrated in FIGS. 11 and 12, which correspond more or less to FIG. 2 of the drawings, the fertile isotope is arranged substantially in an annulus 332 surrounding a central enriched portion 334 of each core 336 or 338 (FIGS. 11A and 12A). The annulus 332 of each core 336 or 338 is, in turn, surrounded by another enriched or seed portion 340, with the average boundaries between the blanket annulus 332 and the inner seed portion 334 and the outer seed portion 340 being represented by vertical dashed lines 342 and 344, respectively, of each graph (FIG. 11 or 12). In the latter arrangements, the blanket annulus 332 effects a shift in reactivity toward the outer periphery of the core 336 or 338 as indicated by a prominence 346 of the associated fast neutronic fluxile curve 348. Similarly, the greater rate of fertile isotope conversion to the corresponding fissionable isotope is illustrated by a prominence 350 of the associated thermoneutronic curve 352 (FIG. 11 or 12), when compared with the relatively minor prominence 354 of the thermoneutronic curve 306' of the conventional converter-type loading arrangement of FIG. 8.

In FIG. 13 the change in reactivity $\delta K/K$ resulting from replacing an enriched fuel assembly by a fertile assembly at various points along the radius of a uniform reactor core is shown. The reactor core and fuel assemblies contemplated in the preparation of FIG. 13 are similar in size and structure to the arrangements illustrated in FIGS. 1 and 2 of the drawings. However, in FIG. 13 a uniform, enriched core is postulated wherein given ones of enriched fuel assemblies are replaced successively by a similarly shaped, fertile assembly at locations varying from the center of the core to its periphery. Thus, it is seen that the single fertile assembly adjacent the center of the core decreases the reactivity to a much greater extent than one such assembly disposed at the outer periphery of the core. Therefore, when a fertile assembly located adjacent the center of the core becomes enriched by gradual nuclear conversion to a fissionable isotope throughout the lifetime of the core, the latter fertile assembly ultimately tends to increase the reactivity of the core to a similarly greater extent.

From the foregoing it will be apparent that novel and efficient neutronic reactor core arrangements have been disclosed herein. In each of these arrangements, a blanket or fertile material is arranged adjacent the center of the reactor core or that is to say, in those regions of relatively higher neutronic fluxile density and of correspondingly greater influence upon the propagational characteristics of the chain-reaction being sustained within the core. This follows from the fact that in a uniform, finite core, the neutronic fluxile density is greatest in those areas adjacent the center of the core, inasmuch as a considerable number of neutrons constantly are lost from the periphery of the neutronic reactor core. For this reason, nuclear fission and heat generation due to the chain-reaction are both greatest at the center of the core and least at its edges, with both activities in a uniform core following an approximate cosine curve distribution from the center to the edge of the reactor core. Thus, the blanket material need not be disposed precisely at the center of the reactor core but can be located a distance therefrom and still be disposed in an area of relatively higher neutronic fluxile density and of relatively greater importance to propagating the chain-reaction.

Accordingly, numerous modifications of the invention will occur to those skilled in the art without departing from the spirit and scope of the invention.

I claim as my invention:

1. A neutronic reactor comprising a vessel, a generally cylindrical core structure mounted within said vessel, a plurality of uniformly elongated fuel element assemblies supported within said core structure, a first group of said assemblies being arranged in a parallel array in the central region of said core structure, an annular second group of said assemblies being arranged parallelly and outwardly of said first group, said second group substantially surrounding said first group, and an annular third group of said assemblies being arranged parallelly and outwardly of said first and said second groups, said third group substantially surrounding said second group, said second group containing fissile material selected from the group consisting of natural uranium and natural thorium, and said first and said third groups containing fissile material having a relatively low uniform enrichment of from one to ten percent and containing sufficient fissile material at least initially to sustain a chain reaction, and means for removing from said vessel the heat generated by said reaction.

2. A neutronic reactor comprising a vessel, a generally cylindrical core structure mounted within said vessel, a plurality of uniformly elongated fuel element assemblies supported within said core structure, a first group of said assemblies being arranged in a parallel array in the central region of said core structure, an annular second group of said assemblies being arranged parallelly and outwardly of said first group, said second group substantially surrounding said first group, and an annular third group of said assemblies being arranged parallelly and outwardly of said first and said second groups, the numbers of equally sized assemblies in said first, said second and said third groups respectively being in the ratio of about 1:3:4 to about 1:8:10, said third group substantially surrounding said second group, said second group containing fissile material selected from the group consisting of natural uranium and natural thorium, and said first and said third groups containing fissile material having a relatively low uniform enrichment of from one to ten percent, and containing sufficient fissile material at least initially to sustain a chain reaction, and means for removing from said vessel the heat generated by said reaction.

3. A neutronic reactor comprising a vessel, a core structure mounted within said vessel, a plurality of fuel element assemblies supported within said core structure and being divided into a plurality of groups, a first group of said assemblies being arranged in the central region of said core structure, the remainder of said groups being arranged outwardly of and substantially surrounding said first group, said first group containing fissile material having a relatively lower percentage enrichment than the remainder of said groups, the remainder of said groups containing fissile material having a relatively higher enrichment in the range of from one to ten percent than said first group and containing sufficient fissile material at least initially to sustain a chain reaction, the percentage enrichment of said groups increasing toward the outer periphery of said core structure, and means for removing from said vessel the heat generated by said reaction.

4. A neutronic reactor comprising a vessel, a core structure mounted within said vessel, a plurality of fuel element assemblies supported within said core structure, a first group of said assemblies being disposed in the central region of said core structure, a second group of said assemblies being arranged outwardly of and substantially surrounding said first group, a third group of said assemblies being arranged outwardly of and substantially surrounding said first and said second groups, the percentage enrichment of said groups lying in the range including zero to ten percent, the percentage enrichment of at least the two outermost ones of said groups increasing toward the outer periphery of said core structure, at least one of said group containing sufficient fissile material at least initially to sustain a chain reaction, and means for removing from said vessel the heat generated by said reaction.

5. A neutronic reactor comprising a vessel, a core structure mounted within said vessel, a plurality of fuel element assemblies supported within said core structure and divided into a plurality of groups, a first group of said assemblies being disposed in the central region of said core structure, a second group of said assemblies being disposed outwardly of and substantially surrounding said first group, the remainder of said groups being disposed outwardly of said second group so that the remainder of said groups substantially surrounds said first and said second groups, said second group containing fissile material having a relatively lower percentage enrichment than said first and the remainder of said groups, said first and the remainder of said groups containing fissile material having a relatively higher enrichment of from one to ten percent than said second group and containing sufficient fissile material at least initially to sustain a chain reaction, and means for removing from said vessel the heat generated by said reaction.

(References on following page)

References Cited by the Examiner

UNITED STATES PATENTS

| | | | |
|---|---|---|---|
| 2,774,730 | 12/56 | Young | 176—43 |
| 2,975,117 | 3/61 | Zinn | 176—18 |
| 2,982,709 | 5/61 | Miles | 176—17 |
| 2,982,713 | 5/61 | Sankovich et al. | 176—61 |
| 2,992,174 | 7/61 | Edlund et al. | 176—18 |

FOREIGN PATENTS

| | | |
|---|---|---|
| 799,725 | 8/58 | Great Britain. |

OTHER REFERENCES

ANL–5607 (EBWR), prepared by Argonne National Laboratory, USAEC Nuclear Technology Series, pp. 23 and 24, May 1957. 204—154.26.

International Conference on the Peaceful Uses of Atomic Energy, vol. 3, Geneva Papers, August 1955, EBWR, pp. 250–262, 289–291, 363–364, 387. Barnes p. 333; Simpson p. 218. U.N. Publication, N.Y.

Nucleonics, vol. 14, No. 8, August 1956, pages 40–41.

TID–7506, (parts I and II), AEC Document "Papers Presented at the Technical Briefing Session of the Boiling Water Reactor Program and the Fast Reactor Program" held at Idaho Falls, Idaho, Nov. 1–2, 1955, July 1956. Part 1 issued July 1956; II: declas. January 1957.

CARL D. QUARFORTH, *Primary Examiner.*

LEON D. ROSDOL, REUBEN EPSTEIN, *Examiners.*